United States Patent [19]

Minnick et al.

[11] 3,870,535
[45] Mar. 11, 1975

[54] METHOD OF TREATING COAL MINING REFUSE

[75] Inventors: Leonard John Minnick, Cheltenham; Charles L. Smith, Conshohocken; William C. Webster, Norristown, all of Pa.

[73] Assignee: IV Conversion Systems, Inc., Philadephia, Pa.

[22] Filed: Dec. 26, 1973

[21] Appl. No.: 427,702

Related U.S. Application Data

[63] Continuation-in-part of Ser. No. 222,384, Jan. 31, 1972, abandoned.

[52] U.S. Cl. ........ 106/118, 106/288 SS, 106/DIG. 1
[51] Int. Cl............................................ C04b 7/321
[58] Field of Search 106/85, 89, 105, 109, 117–120, 106/288 SS, DIG. 1

[56] References Cited
UNITED STATES PATENTS
2,241,604   5/1941   Knibbs et al...................... 106/109

Primary Examiner—J. Poer
Attorney, Agent, or Firm—Miller, Frailey & Prestia

[57] ABSTRACT

Sulfuric acid-containing coal mining refuse is reacted in the presence of moisture with lime, and preferably also with a pozzolanically active material such as fly ash, whereby the existing sulfuric acid is neutralized with lime and further reacted with lime and pozzolan to produce a non-polluting cementitious material, which is self-hardening at atmospheric pressure. This material may be used as structural fill or as a road base material. Alternatively, piles of such refuse may be treated so that a self-hardening mixture is formed either totally or on the surface thereof, thereby preventing further water percolation therethrough and resultant subsurface water contamination.

17 Claims, No Drawings

1

METHOD OF TREATING COAL MINING REFUSE

This is a continuation-in-part of U.S. patent application Ser. No. 222,384, filed Jan. 31, 1972 (now abandoned), of common inventorship and assignment herewith.

This invention relates to a method of treating coal mining refuse otherwise known as tailings to prevent ground water pollution thereby and to utilize such refuse as selfhardening construction materials and to the products of this method.

A common and undesirable by-product of coal mining and coal extraction processes is the mineral refuse surrounding and within the coal vein which has historically been of no value. As a result, this refuse, often called "tailings," has therefore been dumped in large open storage piles, often forming small mountains (in some cases up to tens of millions of tons) of the unwanted and unsightly material. Vast acreages, particularly in the coal mining areas of Pennsylvania, West Virginia, Kentucky and other states where the coal mining industry has been active, have thus been despoiled.

Apart from preempting such land from otherwise useful purposes and destroying the landscape, these quantities of tailings have been a persistent and substantial source of water pollution. This occurs as air and rain water react with these enormous piles or refuse. The sulfur-containing constituents of the refuse, usually pyrites (iron disulfide) react with air and water to form sulfuric acid ($H_2SO_4$). Almost all coal and coal tailings contain some sulfur and some United States coal exceeds 5 percent sulfur (corresponding to nearly 10% pyrites). The amount of sulfuric acid formed can therefore be substantial. This acid is gradually and continuously leached from the refuse pile by the rain water percolating through the pile, ultimately reaching surface and subsurface bodies of water and contaminating them to the point where potability and the ability of organic life to survive therein are seriously impaired if not destroyed. The acidic leachate so created carries with it substantial quantities of iron in the ferrous state which are further oxidized in water solution to ferric ions, which are deposited as ferric hydroxide (a yellow-brown slime) along stream beds. All of this results in vast quantities of water devoid of aquatic life and unsuitable for many common uses. The mechanism of these reactions is generally accepted as follows:

1. Oxidation of ferrous sulfide to ferrous sulfate and sulfuric acid.

$$2FeS_2 + 2H_2O + 7O_2 \rightarrow 2FeSO_4 + 2H_2SO_4$$

2. Oxidation of ferrous sulfate to ferric sulfate.

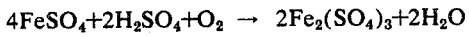
$$4FeSO_4 + 2H_2SO_4 + O_2 \rightarrow 2Fe_2(SO_4)_3 + 2H_2O$$

3. Precipitation of ferric hydroxide and regeneration of sulfuric acid.

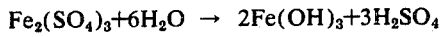
$$Fe_2(SO_4)_3 + 6H_2O \rightarrow 2Fe(OH)_3 + 3H_2SO_4$$

An obvious method to eliminate the extensive piles of waste material would be to use the refuse as a crushed aggregate in road base or fill. However, the potential pollution effects described above are not abrogated in such use so, as a practical matter, use of coal mining tailings as aggregate or fill is not a realistic possibility.

Having in mind these problems, it is an object of the present invention to provide a practical method for treating coal mining tailings so as to render such tailings non-polluting, with respect to available iron and sulfur compounds.

It is a further object of this invention to provide a method of treating coal mining tailings so as to render this material useful as a self-hardening material.

Still further it is an object of this invention to provide an economically feasible method of treating the refuse from coal extraction processes and thereby to reclaim the refuse for useful purposes and/or to reclaim the land upon which such refuse is now stored.

These and other objects are met, in accordance with the present invention, by the treatment of coal mining tailings from coal extraction processes with lime, or lime and a pozzolanic material, to react at atmospheric pressure for at least several days, in the presence of moisture, with the sulfate ions that have been released from the tailings and in some cases also to react with the soluble iron products in the tailings.

The reaction will generally prevent further formation of acidic materials in the processed tailings; but in the event additional acid is formed, it will be reacted with the lime-pozzolan preventing thereby any acidic leachate. The net result is a quite impermeable, hardened, non-polluting composition.

With regard to the sulfur-containing coal mining refuse which may be treated in accordance with the present invention, this refuse generally consists of impure coal, pyrites, sandstone, shale, etc., in physical sizes sometimes exceeding one-ton pieces and running to the low side of 325 mesh in extreme cases. Intimate admixture with this refuse therefore in accordance with the treatment method of the present invention may be accomplished in different manners depending on the physical form of the refuse. In the case of larger particle size refuse, it may be necessary to mechanically reduce the particle size thereof in order to produce the necessary admixture. If the added materials are in sufficiently dilute water suspension, they may be diffused throughout the mine tailings being treated without mechanical mixing.

The pozzolans to be used with the invention are alumino-siliceous in nature and may be either natural or artificial. Certain shales are known to have pozzolanic properties. Where these are present in the coal mining refuse in a size fraction substantially finer than 74 microns, they may serve partially (or in some cases completely) as the pozzolans utilized in the process of the invention. Also utilizable are artificial pozzolans such as certain incinerator ashes and most preferably fly ash, as ordinarily produced in pulverized coal burning power generators, and collected from the exhaust stacks thereof. Fly ash is generally considered to be a waste material. Therefore, it is inexpensive and advantageous for use in the present invention.

As used throughout this specification and claims, the term "lime" indicates quicklime, hydrated lime and slaked lime. The term "hydrated lime" indicates a dry powder obtained by treating quicklime with water enough to satisfy its chemical affinity for water under the conditions of its hydration. It consists essentially of calcium hydrate or a mixture of calcium hydrate and magnesium oxide and/or magnesium hydroxide. In the above definition quicklime is used to indicate a calcined material the major portion of which is calcium oxide (or calcium oxide in natural association with a lesser amount of magnesium oxide) capable of slaking with water. The term "slaked lime" is used interchangeably with "hydrated lime." Both hydrated lime and slaked lime may be associated with excess water, resulting in a moist or slurried state or condition.

Hydrated lime is generally of a particle size ranging from 40 $\mu$ to 1 $\mu$ in diameter with many of the smaller particles being agglomerated. These particles react in this system to neutralize $H_2SO_4$, forming gypsum ($CaSO_4 \cdot 2H_2O$); in the presence of water this gypsum can further react with additional hydrated lime and aluminum ions (either from the fine fraction of the tailings or from added pozzolanic material).

While quicklime may be used in the present invention if additional water is provided to hydrate the lime, hydrated lime, which is readily available and which commonly occurs in more finely divided form then quicklime, is preferred.

While not intended to be limited thereto, the inventors herein believe that the products of this invention are generally of the variety $3CaO \cdot Al_2O_3 \cdot 3CaSO_4 \cdot 30-32H_2O$ or $3CaO \cdot Al_2O_3 \cdot CaSO_4 \cdot 10-12H_2O$. Substitutions for various of the ions within these sulfo-aluminate hydrates are also possible: For example, ferric ions can exchange with the aluminum ions, and, to some extent, magnesium ions with calcium ions. Since these products are formed during the early stages of the reaction (beginning almost immediately and continuing for several weeks) the sulfate ions in the mining tailings are tied up beneficially in the reaction, and are no longer a source of pollution. This autogenous reaction thus occurs at atmospheric pressure and results in a chemically stabilized composition which is, for practical purposes, inert. After at least several days (generally tested for compressive strength and permeability at 7 days), the composition or treated quantity of refuse is rendered useful and ecologically acceptable as landfill, or as a recreation or construction site.

The formation of the complex sulfo-aluminate in the process of this invention also involves a substantial amount of water which ends up as water of hydration in the crystal structure of the product. This results in a physical change in the mass which is mildly expansive and as a result of this, the permeability of the mass of the tailings is substantially reduced as the reaction progresses.

The amount of water which may be used varies within a wide range depending on the characteristics of the solid materials to be mixed and reacted. Generally, the solids, particularly the tailings, will contain some atmospheric moisture. If they have been permitted to dry, they should be wet down or saturated, prior to incorporation in the cementitious mixes of this invention. The total mixes should be damp and compactible but not flowable.

For a determination of the optimum amount of water to be used in a given mix, the solids mix (with the mine tailings in a non-dried state, pre-wetted, if necessary) is combined with varying amounts of water and the density of the composition is measured. Above and below the optimum water content, the density of the composition will decrease rapidly. At the optimum or maximum density, the mixture matrix will have absorbed the maximum water it can take without displacement of solid reactants. This is the preferred water content for any given mix.

The lime is initially utilized to neutralize the free sulfuric acid present in the tailings, after which it is utilized in the formation of the cementitious reaction products. In most instances, substantially all of the lime will be consumed in the process. While a significant quantity of pyrites may remain, no significant amount of additional sulfuric acid can be formed therefrom since the particles of iron disulfide becomes isolated from the action of air and water by virtue of the protection and isolation of the impermeable mass of which it is part.

In treating coal mining tailings, in accordance with the present invention, additives such as reducing agents and accelerators, such as sodium hydroxide, and the like, which are generally known to be beneficial to the pozzolanic or sulfo-pozzolanic reaction, may also be used.

In one aspect of treating coal mining tailings, within the scope of the present invention, the surface of an existing tailings pile or "mountain" is coated with a lime or lime and pozzolan slurry. The slurry will penetrate into the pile, preferably to a depth of at least 6 inches, and will react with the tailings to form an impervious shell over the pile, virtually eliminating further rain water percolation. Alkaline water that may be leached through the slurry-tailings mixture in the early stages of the reaction (i.e., before the mass becomes impermeable) will react with the sulfate ions which would otherwise be leached from the underlayer of the pile. Preferably, the slurry should be intimately mixed with the top layer of the pile (mixed in place, or picked up, mixed, and returned to the pile) in order to facilitate a rapid chemical reaction.

Alternatively, the entire tailings storage pile or "mountain" may be picked up (in reasonable increments) and mixed with lime or lime and pozzolan to neutralize and convert the sulfuric acid therein. The mixture may then be returned to its original location, or may be utilized as non-polluting fill material or as a compactable roadbase material. These latter choices are the most desirable from an ecological point of view, since not only is the acid leachate from the piles eliminated, but the refuse tailings pile is entirely removed and converted to useful purposes.

As in any chemical reaction process, physical contact of the reactants is necessary and for that purpose, treating coal mining refuse in accordance with the present invention is best effected by intimately admixing the refuse with the treating material described herein. In any event, while the reaction in the process of the present invention begins almost immediately, at least several days (preferably seven or more) should be allowed for the atmospheric pressure hardening or curing reaction to proceed to the point where the composition may be safely considered an ecologically acceptable land fill or construction material.

As to the type and amount of treating materials necessary for the present invention, the treating materials necessarily involve moisture to provide a suitable reaction medium for the various ions. Preferably, water comprises 5 – 15 percent of the total reaction mixture, i.e., the treating materials and the coal mining refuse to be treated, but optimum water content for any mix is best determined for each specific mix as described above.

Lime, in a reactive form such as hydrated lime or dihydrated lime, is required both to react with the sulfuric acid present in the tailings and to further react with the gypsum (formed in the neturalization reaction) and pozzolan. Since the acid should be fully neutralized the effectiveness of the present invention depends on an amount of reactive lime greater than that stoichiometrically required to react with the sulfuric acid that is available at the time the process is carried out. One to 6 percent of hydrated lime by weight of the total reaction mixture in excess of that stoichiometrically necessary to neutralize this sulfuric acid content is preferably used.

From about 4 to 12 percent pozzolan by weight of the total reaction mixture is required in order to achieve the desired reactions. In certain instances, additional pozzolan (most often fly ash), beyond that required for the chemical reactions, in quantities up to about 25 percent may also be useful as a filler material in order to obtain a well graded composition.

In all cases, the required amounts of reactants are determined based on the amount and nature of the mining refuse to be treated. For example, only an impermeable shell is to be formed on a large waste pile. The amount of waste in the shell layer would determine how much lime is required.

A typical example in which the present invention may be used to provide a usable road base is as follows:

A bituminous coal tailings pile, having an average iron disulfide content of 3 percent is fed through a roll crusher and vibrating screens to produce a graded material of maximum size of 1 inch. The crushed and sized tailings are blended with lime and pozzolan in a pug mill to achieve a composition which is 90 percent tailings, 4 percent hydrated lime, and 6 percent fly ash, plus 8 percent water. The dampened mass is carried to the construction site where it is spread in sufficient quantity to yield an ultimate depth of 6 inches after compaction with a self-propelled rubber tired roller and a steel wheel roller. After compaction, the in-place dry density will approximate 110 lbs. per ft$^3$. The road base can be immediately used for construction traffic since it has adequate mechanical stability. The neutralization of sulfuric acid begins in the pug mill mixing step, and the early strength-and-impermeability-developing chemical reactions take place after the material is in place. An asphaltic wearing course is usually placed over the compacted composition to prevent possible dusting or wear from traffic.

To illustrate further the use of the present invention, and without intending thereby to limit the scope of the present invention, several examples are presented below to demonstrate some of the characteristics of the product which have been tested to date.

EXAMPLE 1

A representative sample of anthracite tailings was obtained from a large pile near the city of Hazleton, Pennsylvania. This sample was reduced in size, resulting in the following gradation:

| | |
|---|---|
| % Passing 3/8 | 100 |
| % Passing No. 4 Mesh | 62.5% |
| % Passing No. 16 Mesh | 26.4% |
| % Passing No. 100 Mesh | 6.4% |

In order to test the development of impermeability, specimens were prepared as delineated in American Society for Testing and Materials Specification C 593, (Specification for Fly Ash and Other Pozzolans for use with Lime) Section 8 - Non-Plastic Mixtures; these cylinders (4 inches in diameter by 4 ½ inches in height) were tested at two ages, immediately after forming and after 7 days curing 100° F in sealed containers. The test procedure consisted of sealing the surfaces of the sides of the cylinders with paraffin leaving openings at the top and bottom surfaces. A 4 foot head of water was placed on the top of each cylinder and, after a period for saturation, the rate of leaching through the cylinder was measured. As is indicated in the table below, the rate, specifically in the coarser compositions, was reduced as the chemical reaction progressed.

| Composition | | | |
|---|---|---|---|
| % Graded Mine Tailings | 75.1 | 77.0 | 82.3 |
| % Bituminous Fly Ash | 10.9 | 9.5 | 5.2 |
| % Dolomitic Monohydrate | 5.3 | 5.2 | 4.2 |
| % Water | 8.7 | 8.3 | 8.3 |
| Permeability (mls/min) | | | |
| Immediate | 1 | 29.1 | 26.5 |
| 7 days, 100°F | .1 | 1 | 1.3 |

EXAMPLE 2

Several compositions as described in the table below were blended in a Hobart N 50 mixer. Cylinders 1 ⅛ inches in diameter were formed using a piston-type mold in conjunction with a Carver laboratory press at 300 lbs./sq. in. pressure. These cylinders so formed were cured at 100° F for 7 days in sealed containers. The unconfined compressive strengths given in the table are averages of three specimens each. The tailings are bituminous coal mining refuse supplied from the vicinity of Ebensburg, Pennsylvania. The initial sample consists of laminar pieces varying from 3 inches to 10 mesh in size having a specific gravity of approximately 2.0. To obtain aggregate sizing proportionate to the small specimen size used herein, the sample received was processed through a jaw crusher and sieved to pass through a 4 mesh sieve. A typical bituminous fly ash and a dolomitic monohydrated lime — $Ca(OH)_2 \cdot MgO$ were used.

| Sample Designation | % Tailings | % Water | % Lime | % Fly Ash | Compressive Strength 7 Days (PSI) |
|---|---|---|---|---|---|
| A | 90 | 5 | 5 | — | 40 |
| B | 85 | 5 | 5 | 5 | 80 |
| C | 82.5 | 5 | 5 | 7.5 | 90 |
| D | 85 | 10 | 5 | — | 65 |
| E | 77.5 | 12.5 | 5 | 5 | 185 |
| F | 72.5 | 12.5 | 5 | 10 | 225 |
| G | 78.5 | 12.5 | 4 | 5 | 170 |
| H | 73.5 | 12.5 | 4 | 5 | 165 |
| I | 80 | 15 | 5 | — | 125 |
| J | 75 | 15 | 5 | 5 | 200 |
| K | 70 | 15 | 5 | 10 | 180 |

EXAMPLE 3

Tests similar to those described in Example 2 were run using a sample of anthracite coal mining tailings. As in Example 2, the tailings were reduced to pass the 4 mesh sieve for convenience in making the small specimens. The fly ash, lime, as well as the procedure for forming and curing specimens is the same as in Example 2.

| Sample Designation | % Tailings | % Water | % Lime | % Fly Ash | Compressive Strength 7 Days (PSI) |
|---|---|---|---|---|---|
| A | 90 | 5 | 5 | — | 107 |
| B | 85 | 5 | 5 | 5 | 173 |
| C | 82.5 | 5 | 5 | 7.5 | 207 |
| D | 85 | 10 | 5 | — | 223 |
| E | 77.5 | 12.5 | 5 | 5 | 350 |
| F | 72.5 | 12.5 | 5 | 10 | 380 |
| G | 78.5 | 12.5 | 4 | 5 | 395 |
| H | 73.5 | 12.5 | 4 | 10 | 353 |
| I | 80 | 15 | 5 | — | 337 |
| J | 75 | 15 | 5 | 5 | 285 |
| K | 70 | 15 | 5 | 10 | 480 |

EXAMPLE 4

Four of the highest strength formulations from Example 3 were selected and submitted to the compressive strength test delineated in American Society for Testing and Materials Specification C-593 (Specification for Fly Ash and Other Pozzolans for use with Lime) Section 8 — Non-Plastic Mixtures, the only exception being that the anthracite refuse was screened to pass the ¾ inch sieve. This method utilized 4 inch diameter cylinders cured at 100° F for 7 days; the same fly ash and lime were used as in earlier examples. The unconfined compressive strengths of these specimens are tabulated below:

| Sample Designation | % Water | Dry Density lb/Ft³ | Compressive Strength 7 Day (PSI) |
|---|---|---|---|
| E | 7.4 | 102 | 489 |
| F | 8.3 | 108 | 586 |
| G | 7.4 | 107 | 502 |
| K | 7.8 | 106 | 700 |

EXAMPLE 5

Several compositions were prepared as in Examples 3 and 4 except that the anthracite tailings used were crushed and screened to the following gradation:

| % thru No. 8 | 100 |
|---|---|
| No. 16 | 80 |
| No. 30 | 60 |
| No. 50 | 30 |
| No. 100 | 15 |

The 1 ⅛ inch diameter cylinders were pressed at 500 psi, and the compressive strength was tested after 2, 7 and 14 days of curing at 100° F. The sodium hydroxide used was added as a solution containing 0.75 grams NaOH/ml.

| % Lime | % Fly Ash | % Tailings | % NaOH | % Water | Compressive Strength psi (100° F) | | |
|---|---|---|---|---|---|---|---|
| | | | | | 2 Days | 7 Days | 14 Days |
| 2.6 | 10.3 | 72.8 | None | 14.3 | 20 | 92 | 300 |
| 2.6 | 10.2 | 72.4 | 0.6 | 14.2 | 220 | 420 | 475 |
| 2.6 | None | 82.6* | 0.6 | 14.2 | 105 | 280 | 295 |

*10.2% Fly Ash replaced by 100 mesh tailings

While this invention has been described with respect to particular embodiments and examples, it should be understood that it is not limited thereto. The appended claims therefore are intended to define specifically the invention including all of its various embodiments and modifications as would be obvious to those skilled in the art.

We claim:

1. Method of treating sulfuric acid-containing coal mining refuse comprising intimately admixing said refuse, in the presence of water, with lime, the amount of lime exceeding that stoichiometrically necessary to neutralize said sulfuric acid content of said refuse, and permitting said admixture to harden, at atmospheric pressure, for at least several days.

2. Method of treating mining refuse, as recited in claim 1, wherein pozzolanically active particulate material is concurrently intimately admixed with said refuse and hydrated lime.

3. Method of treating mining refuse, as recited in claim 2, wherein said pozzolanically active material is fly ash.

4. Method of treating mining refuse, as recited in claim 3, wherein water comprises 5 – 15% by weight of the total reaction mixture.

5. Method of treating mining refuse as recited in claim 3, wherein said lime comprises an amount exceeding the amount necessary stoichiometrically to neutralize the sulfuric acid content by 1 – 6% by weight of the total reaction mixture.

6. Method of treating mining refuse, as recited in claim 3, wherein said fly ash comprises 4 – 12% by weight of the total reaction mixture.

7. Method of treating mining refuse, as recited in claim 3, wherein said refuse is first mechanically reduced in particle size.

8. Method of treating mining refuse, as recited in claim 1, wherein water comprises 5 – 15% by weight of the total reaction mixture and line comprises an amount exceeding the amount necessary stoichiometrically to neutralize the sulfuric acid content by 1 – 6% by weight of the total reaction mixture.

9. Method of treating mining refuse, as in claim 6, wherein said pozzolanically active material is fly ash which comprises 4 – 12% by weight of the total reaction mixture.

10. Method of treating a surface portion of a mass of sulfuric acid-containing coal mining refuse, comprising intimately admixing said surface portion of said refuse, in the presence of water, with lime, the amount of lime exceeding that stoichiometrically necessary to neutralize said sulfuric acid content of said surface portion of said refuse, wherein said admixture also includes fly ash and 5 – 15%, by weight, water and permitting said admixture to cure autogenously under ambient, atmospheric pressure for at least several days.

11. Method of treating sulfuric acid-containing coal mining refuse comprising intimately admixing said refuse, in the presence of water, with lime, the amount of lime exceeding that stoichiometrically necessary to neutralize said sulfuric acid content of said refuse, emplacing said admixture over the surface of a site open to the atmosphere and permitting the thus emplaced admixture to cure autogenously for at least several days.

12. Method, as recited in claim 11, wherein the water content of said reaction mixture is that which provides maximum density in said mixture.

13. Method, as recited in claim 8, wherein the water content of said reaction mixture is that which provides maximum density in said mixture.

14. Method, as recited in claim 9, wherein the water content of said reaction mixture is that which provides maximum density in said mixture.

15. Product produced by the process of claim 12.
16. Product produced by the process of claim 13.
17. Product produced by the process of claim 14.

* * * * *